United States Patent Office 3,485,853
Patented Dec. 23, 1969

3,485,853
BICYCLO[2.2.2]OCTANE-1-CARBOXYLATE ESTERS OF PROGESTATIONAL STEROIDS
Alexander Cross, Mexico City, Mexico, and John H. Fried, Palo Alto, Calif., assignors to Syntex Corporation, Panama, Panama, a corporation of Panama
No Drawing. Filed Sept. 7, 1967, Ser. No. 665,998
Int. Cl. C07c 169/36, 173/00, 167/28
U.S. Cl. 260—397.4                 28 Claims

ABSTRACT OF THE DISCLOSURE

Bicyclo[2.2.2]octane-1-carboxylate, bicyclo[2.2.2]octane-1-methylenecarbonate, and tricyclo[3.3.1.1$^{1,5}$]decane-1-methylenecarbonate esters of $\Delta^4$-pregnane steroids which esters are useful for their long-acting anti-fertility and progestational activity and processes for the preparation of these novel esters.

---

This invention relates to new and useful steroid esters. It more specifically pertains to novel and useful steroidal bicyclo[2.2.2]octane-1-carboxylate, bicyclo[2.2.2]octane-1-methylenecarbonate, and tricyclo[3.3.1.1$^{1,5}$]decane-1-methylenecarbonate esters as well as various molecularly modified derivatives thereof, the steroid nucleus thus bearing a novel group represented by the Formulas A, B, and C:

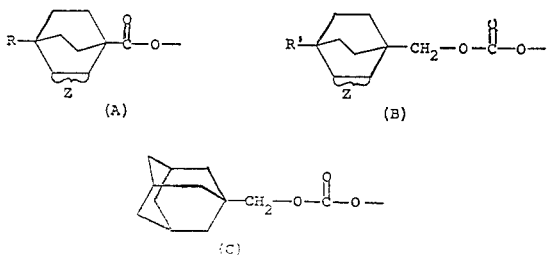

wherein, in each applicable formula, R is hydrogen, chloro, fluoro, trifluoromethyl, cyano, (lower)alkyloxy, acyloxy, (lower)alkyloxymethyl, acyloxymethyl, (lower)alkyl, or aryl; R' is identical in meaning to R, exclusive of cyano, acyloxy, and acyloxymethyl; and Z is a carbon-carbon single bond or a carbon-carbon double bond.

In the preferred embodiments hereof, the steroid nucleus is substituted at the C-3 position with a group represented by one of the above Formulas A, B, and C or at the C-17 position with a group represented by the above Formula A.

These novel steroid esters of the present invention are of the pregnane series and are represented by the following Formula I:

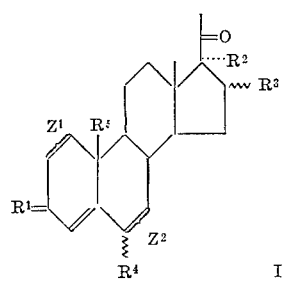

wherein $R^1$ is an oxygen atom or the group

in which $R^6$ is hydroxy and the conventional hydrolyzable esters thereof, tetrahydropyran-2-yloxy, tetrahydrofuran-2-yloxy, cyclopentyloxy, or a polycyclic group represented by one of the above Formulas A, B, and C; $R^2$ is hydrogen, hydroxy and the conventional hydrolyzable esters thereof or a polycyclic group represented by the above Formula A; $R^3$ is hydrogen, hydroxy, methyl, or when taken together with $R^2$, alkylidenedioxy; $R^4$ is hydrogen, chloro, fluoro, or methyl; $R^5$ is hydrogen or methyl; each of $Z^1$ and $Z^2$ is a carbon-carbon single, a carbon-carbon double bond, or a methylene group of formula

in which each of X and Y is hydrogen, chloro, or fluoro; $Z^1$ being a carbon-carbon single bond when $R^1$ is other than an oxygen atom and when $R^5$ is hydrogen; one of $R^2$ and $R^6$ being said polycyclic group.

The terms "(lower)alkyl" and derivations thereof appearing in the above definitions and elsewhere in the instant specification denote alkyl groups containing from 1 to 6 carbon atoms, inclusive, such as methyl, ethyl, propyl, isopropyl, butyl, isobutyl, t-butyl, pentyl, amyl, hexyl, and the like.

The term "conventional hydrolyzable ester" as used herein denotes those hydrolyzable ester groups conventionally employed in the steroid art, preferably those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-$\beta,\beta$-dimethylglutarate, acetoxyacetate, 2-chloro-4-nitrobenzoate, aminoacetate, diethylaminoacetate, piperidinoacetate, $\beta$-chloropropionate, trichloroacetate, $\beta$-chlorobutyrate, dihydrogen phosphate, dibenzyl phosphate, benzyl hydrogen phosphate, sodium benzyl phosphate, cyclohexylammonium benzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

By the term "aryl" is included aryl, aralkyl, and alkaryl groups, such as phenyl, p-chlorophenyl, p-methoxyphenyl, benzyl, phenethyl, tolyl, ethylphenyl, and the like. The wavy line ($\xi$) designates and includes both the alpha and beta configurations.

Thus included within the scope of the present invention are the novel steroid esters represented by the following Formulas (I-a), (I-b), (I-c), and (I-d):

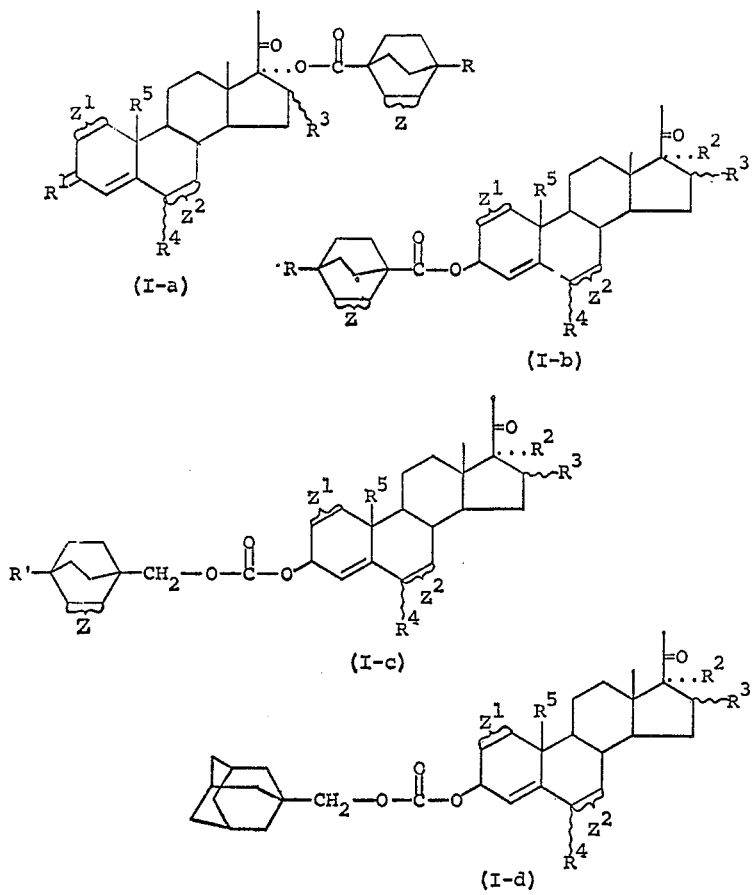

wherein, in each formula, each of R, R′, $R^1$, $R^2$, $R^3$, $R^4$, $R^5$, Z, $Z^1$, and $Z^2$ is as hereinbefore defined.

It will be understood that the above represented compounds and the scope of the instant invention include the corresponding novel steroidal C-3,17 bis esters.

The novel polycyclic esters of this invention possess enhanced and long-acting anti-fertility and progestational activity. They are accordingly useful in the control and regulation of fertility and in the management of various menstrual disorders.

These compounds are administered via the usual routes, whether orally or parenterally, either singly, in conjunction with other medicinal agents, or in pharmaceutically acceptable non-toxic compositions formed by the incorporation of any of the normally employed excipients. Dosage levels vary according to the particular affliction or condition being treated, its degree or severity, and the observed response to treatment but generally a daily rate of from .01 mg. to 1 mg. per kilogram of body weight is satisfactory.

The novel steroid esters of the present invention are prepared via usual esterification reaction union of the polycyclic moiety with the steroid moiety, the specific procedures conditioned upon the particular ester prepared as hereinafter set forth in more detail.

The novel pregnane steroid bicyclic esters hereof which are represented above by Formulas (I-a) and (I-b) are prepared by esterifying the corresponding steroidal alcohol (hydroxy at C-3 and/or C-17) either with an acid halide or acid anhydride which otherwise correspond to the groups represented by Formula A, that is, a bicyclo [2.2.2]octan-1-oic acid halide (preferably, chloride), a bicyclo[2.2.2]octan-1-oic anhydride (preferably, (lower) alkanoic anhydride), or the corresponding C-2 unsaturated and/or C-4 substituted derivatives thereof. Alternatively, the acid per se or the esters thereof can be so employed.

In the practice of the preferred aspects of the above preparation and except as qualified below for the mono C-17 addition, the reaction is conducted in the presence of base, such as is provided by an organic tertiary amine, for example, triethylamine, pyridine, and the like. The reaction is also conducted with an inert solvent, such as dioxane, tetrahydrofuran, diethyl ether, benzene, xylene, and the like, with the reaction being carried out at temperatures of from about 0° C. to about 100° C. or higher upwards of 150° C. Temperatures below 0° C. may be employed depending mainly upon reactants and reaction choice.

The novel monoester is introduced at C-17 by esterifying the 3-keto-$\Delta^4$-17-hydroxy compound by the above procedure minus the amine base but including, instead, the catalytic presence of an arylsulfonic acid, such as p-toluenesulfonic acid, p-nitrobenzenesulfonic acid, and the like. This provides the 17-ester of the 3-keto-$\Delta^4$ derivative as well as some of the corresponding 3-enol ester. The latter is conventionally hydrolyzed such as with potassium carbonate in methanol, to remove the C-3 enol ester group at C-17. Subsequent reduction of the 3-keto group to the 3β-hydroxy-$\Delta^4$ derivative and esterification as described above with amine base but without the need of acid catalyst, furnishes the bis ester compounds. Alternatively, the thus formed 3β-ol can be esterified to a conventional hydrolyzable ester to give the mixed ester compounds.

The novel monoester at C-3 is prepared by, first, selectively reducing the 3-keto group such as with sodium borohydride in anhydrous isopropanol and thereafter esterifying as described above, with amine base but without acid catalyst. Similarly, after the 3-hydroxyl is thus esterified to the novel ester group, the 17-hydroxyl can be converted to its conventional hydrolyzable ester giving the mixed ester compounds. Alternatively and preferred, the conventional ester is present in the starting compounds used for the novel esterification process.

The bicyclo[2.2.2]octane - and bicyclo[2.2.2]oct-2-ene-1-carboxylic acid halides and anhydride for the above procedures are prepared from the corresponding free acid compounds by methods known per se as described, for example, in Wagner and Zook, Synthetic Organic Chemistry, John Wiley and Sons, Inc., N.Y. (1953), p. 546 et. seq. and p. 558 et. seq., respectively.

The corresponding free carboxylic acid compounds from which the acid halides and acid anhydrides are formed are also prepared by known methods. One such method involves treating a 4-substituted or -unsubstituted cyclohexa-1, 3-diene-1-carboxylic acid or -1-carboxylate by the Diels-Alder addition of ethylene, such as according to the conditions set forth in U.S. Patent 3,081,-334 to afford the corresponding 4-unsubstituted or -unsubstituted bicyclo[2.2.2]octane-1-carboxylic acids. Thereafter, the thus obtained saturated acids can be dehydrogenated to the corresponding 4-substituted or -unsubstituted bicyclo[2.2.2]oct-2-ene - 1 - carboxylic acids. Other suitable methods for preparing these acids are set forth by Holtz et al., J. Am. Chem. Soc., 86, 5183 (1964); Kauer et al., J. Org. Chem., 30, 1431 (1965); Grob et al., Helv. Chim. Acta., 41, 1191 (1958); Roberts et al., J. Am. Chem. Soc. 75, 637 (1953); Belgium Patent 665,701; and Netherlands Patent 6,507,979.

The novel pregnane steroid bicyclo carbonate esters hereof which are represented above by Formula I–c are prepared analogously to the methods operable for the preparation of the compounds of Formula I–b as set forth above utilizing, instead, the appropriate steroidal alcohol with the chlorocarbonate (chloroformate) which otherwise correspond to the groups represented by Formula b, that is, a bicyclo[2.2.2]-octane-1-methylenechlorocarbonate or the corresponding C–2 unsaturated and/or C–4 substituted derivatives thereof.

The chlorocarbonate reactants are conveniently prepared via known procedures. First, the corresponding free carboxylic acid compound (obtained as set forth above) is conventionally reduced such as with a metal hydride, for example, lithium aluminum hydride, and the like, in inert solvent, as described by Wagner and Zook, op. cit., p. 155 et seq., and the resultant alcohol (methylol) treated with phosgene such as according to the procedure described in Wagner and Zook, op. cit., p. 483 et seq.

The novel pregnane steroid tricyclic carbonate esters hereof which are represented above by Formula I–d are prepared analogously to the methods set forth above for the preparation of the bicyclic carbonate esters with the substitution of the corresponding tricyclic chlorocarbonate (chloroformate) which otherwise corresponds to the group represented by Formula C above, namely, tricyclo[3.3.1.1$^{1,5}$]decane-1-methylenechlorocarbonate, in lieu of the bicyclo derivatives.

This tricyclic chlorocarbonate compound is similarly prepared from tricyclo[3.3.1.1$^{1,5}$]decane-1-carboxylic acid, otherwise referred to as adamantane-1-carboxylic acid, upon conventional reduction as described above giving the corresponding alcohol (methylol) derivative followed by treatment thereof with phosgene as likewise mentioned supra.

The steroidal alcohol starting compounds are known in the art or can be prepared via processes known per se.

Thus, the substituents represented by $R^4$ and $R^5$ are preferably present in the starting steroids although the 6-halo groups can be introduced by converting the 3-keto-4-ene to its enol ether as by treatment with ethyl orthoformate and treating the thus prepared enol ether intermediate with n-chlorosuccinimide or perchloryl fluoride yielding a 3-keto-$\Delta^{4,6}$-diene containing a 6-chloro or 6-fluoro group, respectively.

Substituents represented by $R^2$ and $R^3$ are also preferably present in the starting steroid. 16α,17α-acetals or ketals are prepared through treatment with a 16α,17α-hydroxy compound with an aldehyde or ketone in the presence of an acid, such as perchloric acid.

The conjugated unsaturated system is introduced as follows. By treating a 3-keto-$\Delta^4$ with 2,3-dichloro-5,6-dicyano-1,4-benzoquinone (D.D.Q.) in, for example, dioxane solvent, the corresponding 3-keto-$\Delta^{1,4}$-diene is prepared. Treatment of the 3-keto-$\Delta^4$-ene with chloranil in ethyl acetate and in the presence of acetic acid produces the corresponding 3-keto-$\Delta^{4,6}$-diene. Similar treatment of the 3-keto-$\Delta^{4,6}$-diene with chloranil in n-amyl alcohol affords the corresponding 3-keto-$\Delta^{1,4,6}$-triene compounds.

Introduction of the halomethylene group at either of positions C–1,2 and/or positions C–6,7 involves treatment of the conjugated unsaturated steroid with a molar excess of an alkali or alkaline earth metal salt of a haloacetic acid, such as bromochloroacetic acid, dichloroacetic acid, trichloroacetic acid, chlorofluoroacetic acid, dichlorofluoroacetic acid, chlorodifluoroacetic acid, and the like. Use of the trihalo acid introduces the dihalomethylene group while a dihalo acid provides the monohalomethylene group.

It is preferably to conduct this latter reaction after certain labile substituents, such as hydroxy groups, have been protected, for example, by converting them to esters, tetrahydropyranyl ethers, or ketones which groups readily facilitate the regeneration of the hydroxyl. This preference is not an absolute necessity, however, since the hydroxyl group which readily becomes involved in side reactions can be regenerated upon execution of a mild hydrolysis.

The C–1,2 and/or C–6,7 fused methylene group is introduced by reaction of the conjugated unsaturated steroid with dimethylsulfoxonium methylide base in dimethylsulfoxide. Alternatively, this group can be provided upon reductive dehalogenation, such as with lithium aluminum hydride, of a halomethylene group, inserted as described above.

These groups can be inserted in a 3-keto-$\Delta^{1,4}$-diene to give the C–1,2 adduct and a 3-keto-$\Delta^{4,6}$-diene to give the C–6,7 adduct. The bis substituted derivatives are ideally prepared by first introducing the desired group at C–1,2 and thereafter generating the $\Delta^{4,6}$ system and introducing the desired group at C–6,7.

The halomethylene and methylene groups so inserted are accomplished with the orientation of the resultant fused grouping including both isomeric alpha and beta configurations in variable ratios. Each isomer can be separated and removed via conventional techniques, such as chromatography, fractional recrystallization, and the like, by virtue of their different physical properties. Although, in some instances, one particular configurational isomer may predominate in the reaction mixture; it will be understood that each, whether specifically mentioned or not, is included within the scope of the present invention.

The C–3 elaboration follows after esterification at C–17 has taken place and the 3-keto function has been selectively reduced. This elaboration is performed by either conventional esterification procedures to give the corresponding conventional hydrocarbon carboxylic acid esters or by treatment of the 3β-hydroxyl group with dihydropyran or dihydrofuran to give the corresponding tetrahydropyran-2-yl and tetrahydrofuran-2-yl ethers thereof, respectively. Treatment of the free hydroxyl group with sodium hydride and cyclopentyl bromide affords the 3β-cyclopentyl ether.

Similarly, these ether groups can be introduced in the C–17 position if it is so desired.

The following examples illustrate the manner by which this invention can be practiced and are not to be con-

EXAMPLE 1

To a solution of 5 g. of pregn-4-en-17α-ol-3,20-dione in 100 ml. of anhydrous benzene are added 1 g. of p-toluene-sulfonic acid and 10 ml. of bicyclo[2.2.2]octane-1-carboxylic acid chloride. The mixture is allowed to stand for 24 hours at room temperature and poured with stirring into ice and water. The organic phase is separated, washed with 10% sodium carbonate solution and with water, dried, and evaporated to yield 17α-(bicyclo[2.2.2]octane-1'-carbonyloxy)pregn-4-ene-3,20-dione and some 3β,17α - bis(bicyclo[2.2.2]octane-1'-carbonyloxy) pregn-3-en-20-one which are separated by chromatography and further purified through recrystallization from ether:hexane.

A suspension of 1 g. of 3β,17α-bis(bicyclo[2.2.2]octane-1'-carbonyloxy)pregn-3-en-20-one in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 17α-(bicyclo[2.2.2]octane-1'-carbonyloxy)pregn-4-ene-3,20-dione which is recrystallized from acetone:hexane.

By using 4-methylbicyclo[2.2.2]oct-ene-1-carboxylic acid chloride in the above procedure, there is prepared the corresponding 17α-(4'-methylbicyclo[2.2.2]oct-2'-ene-1'-carbonyloxy)-pregn-4-ene-3,20-dione.

In a similar manner, the following compounds can be prepared from the appropriate starting compounds:

6-chloro-16-methyl-17α-(bicyclo[2.2.2]octane-1'-carbonyloxy)-19-norpregna-4,6-diene-3,20-dione,
6-chloro-16-methyl-17α-(4'-methylbicyclo[2.2.2]oct-2'-ene-1'-carbonyloxy-19-norpregna-4,6-diene-3,20-dione,
6,16-dimethyl-17α-(bicyclo[2.2.2]octane-1'-carbonyloxy)-pregna-4,6-diene-3,20-dione,
6,16-dimethyl-17α-(4'-methylbicyclo[2.2.2]oct-2'-ene-1'-carbonyloxy)-pregna-4,6-diene-3,20-dione,
6,16-dimethyl-17-(bicyclo[2.2.2]octane-1'-carbonyloxy)-19-norpregna-4,6-diene-3,20-dione,
6,16-dimethyl-17α-(4'-methylbicyclo[2.2.2]oct-2'-ene-1'-carbonyloxy)-19-norpregna-4,6-diene-3,20-dione,
17α-(bicyclo[2.2.2]octane-1'-carbonyloxy)-19-norpregna-4,6-diene-20-dione,
17α-(4'-methylbicyclo[2.2.2]oct-2'-ene-1'-carbonyloxy)-19-norpregna-4,6-diene-3,20-dione,
6-chloro-17α-(bicyclo[2.2.2]octane-1'-carbonyloxy)-19-norpregna-4,6-diene-20-dione,
6-chloro-17α-(4'-methylbicyclo[2.2.2]oct-2'-ene-1'-carbonyloxy)-19-norpregna-4,6-diene-20-dione,
6-chloro-17α-(bicyclo[2.2.2]octane-1'-carbonyloxy)-pregn-4-ene-3,20-dione,
6-chloro-17α-(4'-methylbicyclo[2.2.2]oct-2'-ene-1'-carbonyloxy)-pregna-4-ene-3,20-dione,
6-fluoro-17α-(bicyclo[2.2.2]octane-1'-carbonyloxy)pregna-4,6-diene-3,20-dione,
6-chloro-17α-(4'-methylbicyclo[2.2.2]oct-2'-ene-1'-carbonyloxy)-pregna-4,6-diene-3,20-dione,
6-fluoro-17α-(bicyclo[2.2.2]octane-1'-carbonyloxy)pregna-4,6-diene-3,20-dione,
6-fluoro-17α-(4'-methylbicyclo[2.2.2]oct-2'-ene-1'-carbonyloxy)-pregna-4,6-diene-3,20-dione,
6-methyl-17α-(bicyclo[2.2.2]octane-1'-carbonyloxy)-pregna-4,6-diene-3,20-dione,
6-methyl-17α-(4'-methylbicyclo[2.2.2]oct-2'-ene-1'-carbonyloxy)-pregna-4,6-diene-3,20-dione,
6-methyl-17α-(bicyclo[2.2.2]octane-1'-carbonyloxy)-pregna-4-ene-3,20-dione,
6-methyl-17α-(4-methylbicyclo[2.2.2]oct-2'-ene-1'-carbonyloxy)-pregna-4-ene-3,20-dione,
6-cholor-17α-(bicyclo[2.2.2]octane-1'-carbonyloxy)-pregna-1,4,6-triene-3,20-dione,
6-chloro-17α-(4'-methylbicyclo[2.2.2]oct-2'-ene-1'-carbonyloxy)-pregna-1,4,6-triene-3,20-dione,
16-methyl-17α-(bicyclo[2.2.2]octane-1'-carbonyloxy)-pregna-4,6-diene-3,20-dione,
16-methyl-17α-(4'-methylbicyclo[2.2.2]oct-2'-ene-1'-carbonyloxy)-pregna-4,6-diene-3,20-dione,
16-methyl-17α-(bicyclo[2.2.2]octane-1'-carbonyloxy)-19-nor-pregna-4,6-diene-3,20-dione,
16-methyl-17α-(4'-methylbicyclo[2.2.2]oct-2'-ene-1'-carbonyloxy-19-norpregna-4,6-diene-3,20-dione,
6,7-difluoromethylene-17α-(4'methylbicyclo[2.2.2]oct-2'-ene-1'-carbonyloxy)-pregn-4-ene-3,20-dione,
6,7-methylene-17α-(bicyclo[2.2.2]octane-1'-carbonyloxy)-pregn-4-ene-3,20-dione,
6,7-methylene-17α-(4'-methyl[2.2.2]octane-1'-carbonyloxy)-pregn-4-ene-3,20-dione,
1,2-methylene-17α-(bicyclo[2.2.2]octane-1'-carbonyloxy)-pregn-4-ene-3,20-dione,
1,2-methylene-17α-(4'-methylbicyclo[2.2.2]octane-1'-carbonyloxy)-pregn-4-ene-3,20-dione,
1,2-methylene-6,7-difluoromethylene-17α-(bicyclo[2.2.2]octane-1'-carbonyloxy)-pregn-4-ene-3,20-dione,
1,2-methylene-6,7-difluoromethylene-17α-(4'-methylbicyclo[2.2.2]octane-1'-carbonyloxy)-pregn-4-ene-3,20-dione,
6,7-dichloromethylene-17α-(bicyclo[2.2.2]octane-1'-carbonyloxy)-pregn-4-ene-3,20-dione,
6,7-dichloromethylene-17α-(4'-methylbicyclo[2.2.2]octane-1'-carbonyloxy)-pregn-4-ene-3,20-dione,
6,7-chloromethylene-17α-bicyclo[2.2.2]octane-1'-carbonyloxy)-pregn-4-ene-3,20-dione,
6,7-chloromethylene-17α-(4'-methylbicyclo[2.2.2]octane-1'-carbonyloxy)-pregn-4-ene-3,20-dione,
6,7-fluoromethylene-17α-(bicyclo[2.2.2]octane-1'-carbonyloxy)-pregn-4-ene-3,20-dione,
6,7-fluoromethylene-17α-(4'-methylbicyclo[2.2.2]octane-1'-carbonyloxy)-pregn-4-ene-3,20-dione,
6,7-chlorofluoromethylene-17α-(bicyclo[2.2.2]octane-1'-carbonyloxy)-pregn-4-ene-3,20-dione,
6,7-chlorofluoromethylene-17α-(4'-methylbicyclo[2.2.2]octane-1'-carbonyloxy)-pregn-4-ene-3,20-dione, and
6,7-difluoromethylene-17α-(bicyclo[2.2.2]octane-1'-carbonyloxy)-pregn-4-ene-3,20-dione, as well as other corresponding 17α-mono ester derivatives containing the various possible substituents indicated in the above formulas.

Upon substitution of the appropriate substituted acid chloride (as set forth in the third paragraph of Example 5 infra.) in lieu of the other bicyclo carboxylic acid chloride employed herein, the corresponding C-17 mono ester of the corresponding starting steroid hydroxy compounds hereof are prepared.

EXAMPLE 2

A solution of 200 mg. of pregn-4-en-17α-ol-3,20-dione in 32 ml. of anhydrous isopropanol and 25 mg. of sodium borohydride is stirred at room temperature for 15 hours. One-hundred milliliters of water is added and the resulting suspension is extracted several times with ether. The ether phase is dried over sodium sulfate and evaporated to dryness under reduced pressure to yield pregn-4-ene-3β,17α-diol-20-one which may be further purified by recrystallization from ether.

A mixture of 2.5 g. of pregn-4-ene-3β,17α-diol-20-one in 15 ml. of pyridine containing 4.0 g. of bicyclo[2.2.2]octane-1-carboxylic acid chloride is heated at steam bath temperature for about two hours. The mixture is then poured into ice water and the solid which forms collected by filtration, washed with water, and dried yielding 3β-(bicyclo[2.2.2]octane-1'-carbonyloxy) - pregn-4-en-17α-ol-20-one.

A mixture of 2.5 g. of pregn-4-ene-3β,17α-diol-20-one, 10 ml. of pyridine, 20 ml. of benzene, and 5.0 g. of 4-methylbicyclo[2.2.2]oct-2-ene-1-carboxylic acid chloride is heated at reflux temperature for four hours. The mixture is then poured into ice water, the solid which forms is collected by filtration, washed with water, and dried to yield 3β-(4' - methylbicyclo[2.2.2]oct-2'-ene-1'-carbonyloxy)-pregn-4-ene-17α-ol-20-one.

In like manner, the corresponding 3β-mono esters of the other corresponding steroid hydroxy compounds set forth in the fourth paragraph of Example 1 above are prepared, such as:

3β-(4'-methylbicyclo[2.2.2]octane-1'-carbonyloxy)-6-chloro-17α-acetoxypregna-4,6-dien-20-one,
3β-(4'-methylbicyclo[2.2.2]octane-1'-carbonyloxy)-6-methyl-17α-acetoxypregna-4,6-dien-20-one,
3β-(4'-methylbicyclo[2.2.2]octane-1'-carbonyloxy)-17α-acetoxypregn-4-en-20-one,
3β-(4'-methylbicyclo[2.2.2]oct-2'-ene-1'-carbonyloxy)-6-chloro-17α-acetoxypregna-4,6-dien-20-one,
3β-(4'-methylbicyclo[2.2.2]oct-2'-ene-1'-carbonyloxy)-6-methyl-17α-acetoxypregna-4,6-dien-20-one,
3β-(4'-methylbicyclo[2.2.2]oct-2'-ene-1'-carbonyloxy)-17α-acetoxypregn-4-en-20-one,
3β-4'-methylbicyclo[2.2.2]octane-1'-carbonyloxy)-6-chloro-16α-methylpregn-4-en-20-one,
3β-(4'-methylbicyclo[2.2.2]octane-1'-carbonyloxy)-6β-methyl-16α-methylpregn-4-en-20-one,
3β-(4'-methylbicyclo[2.2.2]oct-2'-ene-1'-carbonyloxy)-6-chloro-16α-methylpregn-4-en-20-one, and
3β-(4'-methylbicyclo[2.2.2]oct-2'-ene-1'-carbonyloxy)-6β-methyl-16α-methylpregn-4-en-20-one.

Upon substitution of the appropriate substituted acid chloride (as set forth in the third paragraph of Example 5) in lieu of either bicyclo[2.2.2]octane-1-carboxylic acid chloride or 4-methylbicyclo[2.2.2]oct-2-ene-1-carboxylic acid chloride in each of the procedures set forth above in the instant example, the corresponding C-3 mono esters of the corresponding starting steroid bishydroxy compounds hereof are prepared.

EXAMPLE 3

By following the procedure set forth in Example 2 above, utilizing bicyclo[2.2.2]octane-1-methylenechlorocarbonate in lieu of bicyclo[2.2.2]octane-1-carboxylic acid chloride, there is prepared 3β-(bicyclo[2.2.2]octane-1'-methylenecarbonyldioxy)-pregn-4-en-17α-ol-20-one.

Similarly, the corresponding 3β-(bicyclo[2.2.2]octane-1-methylenecarbonyldioxy) esters otherwise corresponding to the other steroid compounds set forth in paragraph 4 of Example 1 and the penultimate paragraph of Example 2 above, are prepared.

In like manner, upon substituting the other bicyclomethylenechlorocarbonates prepared as set forth in Example 6, infra., the corresponding 3β-monobicyclochlorocarbonate derivatives of the above compound and those compounds set forth in Example 1 above, are prepared.

EXAMPLE 4

By utilizing the procedure outlined in Example 3 using, instead, tricyclo[3.3.1.1$^{1,5}$]decane-1 - methylenechlorocarbonate, there is prepared 3β-(tricyclo[3.3.1.1$^{1,5}$]decane-1-methylenecarbonyldioxy)-pregn-4-en-17α-ol-20-one.

Similarly, the corresponding 3β-(tricyclo[3.3.1.1$^{1,5}$]-decane-1-methylenecarbonyldioxy) esters, otherwise corresponding to the other steroid compounds set forth in the fourth paragraph of Example 1 and the penultimate paragraph of Example 2 above, are prepared.

EXAMPLE 5

A mixture of 10 g. of bicyclo[2.2.2]octane-1-carboxylic acid, 20 ml. of thionyl chloride in two drops of dimethylformamide, and about 40 ml. of benzene is heated at reflux temperature for about 2.5 hours. The resultant mixture is then fractionally distilled to give bicyclo[2.2.2]octane-1-carboxylic acid chloride.

A mixture of 15 g. of 4-methylbicyclo[2.2.2]oct-2-ene-1-carboxylic acid, 25 ml. of thionyl chloride, and a drop of dimethylformamide is heated at reflux temperature for about 1.5 hours. Fractional distillation of the reaction mixture gives 4-methylbicyclo[2.2.2]oct - 2 - ene-1-carboxylic acid chloride.

Similarly, upon the substitution of other bicyclo[2.2.2]octane-1-carboxylic acids and other bicyclo[2.2.2]oct-2-ene-1-carboxylic acids in the procedures set forth in the immediately preceding two paragraphs, there is obtained the following corresponding acid chlorides:

bicyclo[2.2.2]oct-2-ene-1-carboxylic acid chloride,
4-methylbicyclo[2.2.2]octane-1-carboxylic acid chloride,
4-phenylbicyclo[2.2.2]oct-2-ene-1-carboxylic acid chloride,
4-phenylbicyclo[2.2.2]octane-1-carboxylic acid chloride,
4-n-propylbicyclo[2.2.2]octane-1-carboxylic acid chloride,
4-n-propylbicyclo[2.2.2]oct-2-ene-1-carboxylic acid chloride,
4-ethylbicyclo[2.2.2]octane-1-carboxylic acid chloride,
4-ethylbicyclo[2.2.2]oct-2-ene-1-carboxylic acid chloride,
4-benzylbicyclo[2.2.2]octane-1-carboxylic acid chloride,
4-chlorophenylbicyclo[2.2.2]octane-1-carboxylic acid chloride,
4-chlorobicyclo[2.2.2]octane-1-carboxylic acid chloride,
4-chlorobicyclo[2.2.2]oct-2-ene-1-carboxylic acid chloride,
4-fluorobicyclo[2.2.2]octane-1-carboxylic acid chloride,
4-fluorobicyclo[2.2.2]oct-2-ene-1-carboxylic acid chloride,
4-trifluoromethylbicyclo[2.2.2]octane-1-carboxylic acid chloride,
4-trifluoromethylbicyclo[2.2.2]oct-2-ene-1-carboxylic acid chloride,
4-cyanobicyclo[2.2.2]octane-1-carboxylic acid chloride,
4-cyanobicyclo[2.2.2]oct-2-ene-1-carboxylic acid chloride,
4-acetoxybicyclo[2.2.2]octane-1-carboxylic acid chloride,
4-acetoxybicyclo[2.2.2]oct-2-ene-1-carboxylic acid chloride,
4-methoxybicyclo[2.2.2]octane-1-carboxylic acid chloride,
4-methoxybicyclo[2.2.2]oct-2-ene-1-carboxylic acid chloride,
4-methoxymethylbicyclo[2.2.2]octane-1-carboxylic acid chloride,
4-methoxymethylbicyclo[2.2.2]oct-2-ene-1-carboxylic acid chloride,
4-acetoxymethylbicyclo[2.2.2]octane-1-carboxylic acid chloride, and
4-acetoxymethylbicyclo[2.2.2]oct-2-ene-1-carboxylic acid chloride

EXAMPLE 6

A solution of 1 g. sodium borohydride in 3 ml. of water is added to an ice cooled solution of 1 g. of bicyclo[2.2.2]octane-1-carboxylic acid in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried, and evaporated to yield bicyclo[2.2.2]octane-1-methylol which may be further purified by recrystallization from acetone:hexane.

Bicyclo[2.2.2]octane-1-methylol (15.5 g.) is slowly added with stirring to 15 g. of liquid carbonyl chloride (phosgene) contained in a reaction vessel immersed in a Dry Ice-trichloroethylene bath. During the addition, the temperature of the carbonyl chloride solution is kept at or below 0° C. After the addition is complete, the temperature of the solution is allowed to slowly rise to room temperature. The mixture is maintained at room temperature with stirring for from 10 to 15 hours, steps being taken to remove expelled carbonyl chloride. Thereafter, the reaction mixture is distilled under reduced pressure to give bicyclo[2.2.2]octane-1-methylenechlorocarbonate.

Similarly, the above procedures can be used to prepare the other C–2 unsaturated and/or C–4 substituted analogs thereof otherwise corresponding to the derivatives set forth in the third paragraph of Example 5 above, with the exception of the 4-cyano, 4-acyloxy, and 4-acyloxymethyl derivatives.

EXAMPLE 7

The procedure set forth in Example 6 is repeated substituting tricyclo[3.3.1.1$^{1,5}$]decane-1-carboxylic acid (adamantane-1-carboxylic acid) for bicyclo 2.2.2 octane-1-carboxylic acid thus giving tricyclo[3.3.1.1$^{1,5}$]decane-1-methylol initially and tricyclo[3.3.1.1$^{1,5}$]decane-1-methylenechlorocarbonate as a final product.

EXAMPLE 8

To a mixture of 10 g. of bicyclo[2.2.2]octane-1-carboxylic acid in a solution consisting of 25 ml. of ether and 10 ml. of pyridine is added a cold ether solution containing the chemical equivalent of acetyl chloride. The reaction mixture is allowed to stand at 0° C. for four hours and the resultant precipitate removed by filtration. The solution is washed with 25 ml. of concentrated hydrochloric acid, ice water, a 7% sodium hydroxide solution and again ice water. The washed solution is dried at 0° C. over sodium sulfate, filtered, the ether evaporated to give bicyclo[2.2.2]octane-1-carboxylic acetyl anhydride which can be recrystallized from methanol.

Similarly, the other corresponding mixed anhydride starting compounds are analogously prepared.

These derivatives can be substituted for the corresponding acid chlorides employed in Example 1 with similar results.

EXAMPLE 9

To a suspension of 1 g. of pregn-4-en-17α-ol-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water, and air dried to yield 3β - ethoxypregna-3,5(6)-dien-17α-ol-3,20-dione which is recrystallized from acetone:hexane.

A mixture of 5 g. of 3β-ethoxypregna-3,5(6)-dien-17α-ol-3,20-dione, 2 g. of anhydrous sodium acetate, and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water, and dried under vacuum to yield 6β-chloropregn-4-en-17α-ol-3,20-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water, and dried to yield 6α-chloropregn-4-en-17α-ol-3,20-dione which is recrystallized from acetone:hexane.

A stream of perchloryl fluoride is passed through a solution of 1 g. of 3β-ethoxypregna-3,5(6)-dien-17α-ol-3,20-dione in 25 ml. of dimethylformamide, cooled to 0° C. for five minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water, and dried to yield 6α-fluoropregn-4-en-17α-ol-3,20-dione which is recrystallized from acetone:hexane.

In a similar manner, the other 6-chloro and 6-fluoro derivatives of the instant compounds are prepared.

EXAMPLE 10

To 120 ml. of acetone containing 1 g. of pregn-4-ene-16α,17α-diol-3-,20-dione are added 30 drops of 70% perchloric acid. The mixture is allowed to stand one hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields 16,17-isopropylidenedioxypregn-4-ene-3,20-dione which is recrystallized from methanol.

Similarly, upon substitution of an alternate ketone or aldehyde in lieu of acetone in the preceding paragraph, there are obtained the other alkylidenedioxy substituted compounds hereof. The other appropriate starting steroids can be so elaborated.

A mixture of 1 g. of pregn-4-en-17α-ol-3,20-dione, 1 g. of p-toluenesulfonic acid monohydrate, 50 ml. of acetic acid, and 25 ml. of acetic anhydride is allowed to stand at room temperature for 24 hours and then is poured into water and stirred. This mixture is then extracted with methylene chloride and these extracts are dried and evaporated. The residue is then dissolved in 250 ml. of methanol containing 5 ml. of concentrated hydrochloric acid. After refluxing for one hour, the mixture is neutralized with an aqueous 10% solution of potassium bicarbonate and evaporated. The residue is extracted with methylene chloride, and the methylene chloride extract is washed with water to neutrality, dried, and evaporated to yield 17α-acetoxypregn-4-ene-3,20-dione which is recrystallized from acetone:ether.

To a solution of 5 g. of a pregn-4-en-17α-ol-3,20-dione in 100 ml. of anhydrous benzene are added 1 g. of p-toluenesulfonic acid and 10 ml. of propionaldehyde. The mixture is allowed to stand for 24 hours at room temperature and poured with stirring into ice and water. The organic phase is separated, washed with 10% sodium carbonate solution and with water, dried and evaporated to yield 17α-propionyloxypregn-4-ene-3,20-dione which is further purified through recrystallization from ether:hexane.

A mixture of 2 g. of pregn-4-en-17α-ol-3,20-dione in 8 ml. of pyridine and an equimolar amount of benzoyl chloride is heated at steam bath temperatures for thirty minutes. The mixture is then poured into ice water and the solid which forms is collected by filtration, washed with water, and dried to yield 17α-benzoyloxypregn-4-ene-3,20-dione which is further purified through recrystallization from methylene chloride:hexane.

In like manner, the corresponding conventional hydrolyzable esters of the other compounds hereof, including those already containing a novel ester hereof (and a free hydroxy group) are prepared by following the foregoing procedures. Others can be similarly prepared upon substituting the appropriate acid chloride, such as, for example, the adamantoyloxy ester using adamantoyl chloride.

EXAMPLE 11

A mixture of 0.5 g. of pregn-4-en-17α-ol-3,20-dione, 10 ml. of dioxane, and 0.135 g. of 2,3-dichloro-5,6-dicyano-1,4-benzoquinone is refluxed for ten hours. The mixture is then cooled, filtered, and evaporated to dryness. The residue is dissolved in acetone and this solution is then filtered through 10 g. of alumina and concentrated to yield pregna-1,4-dien-17α-ol-3,20-dione which is further purified by recrystallization from acetone:hexane.

A mixture of 1 g. of pregn-4-en-17α-ol-3,20-dione, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings are colorless. The organic solution is dried over sodium sulfate and the ethyl acetate removed by evaporation. Upon chromatography of the residue on neutral alumina there is obtained pregna-4,6-dien-17α-ol-3,20-dione which can be further purified by recrystallization from acetone: hexane.

EXAMPLE 12

To a gently refluxing and stirred solution of 1 g. of pregna-4,6-dien-17α-ol-3,20-dione in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The solid which forms is collected, washed with water, dried, and chromatographed on alumina, eluting with methylene chloride to yield 6α,7α-difluoromethylenepregn-4-en-17α-ol-3,20-dione and 6β,7β-difluoromethylenepregn-4-en-17α-ol-3,20-dione.

By utilizing the other $\Delta^{4,6}$ compounds hereof, the 6,7-difluoromethylene derivatives corresponding thereto are prepared.

Upon substituting the sodium trichloroacetate for sodium chlorodifluoroacetate in the above procedure, the corresponding 6,7-dichloromethylene derivatives are prepared. Similarly, upon substitution of sodium dichlorofluoroacetate, sodium dichloroacetate, and sodium chlorofluoroacetate of the above procedure, there are respectively obtained the corresponding 6,7-chlorofluoromethylene, 6,7-chloromethylene, and 6,7-fluoromethylene derivatives.

EXAMPLE 13

A mixture of 7 g. of pregna-1,4-dien-17α-ol-3,20-dione, 25 ml. of dry benzene, 5 ml. of ethylene glycol, and 50 mg. of p-toluenesulfonic acid monohydrate is refluxed for 16 hours using a water separator. The reaction mixture is then washed with aqueous sodium bicarbonate solution and water, dried, and evaporated to dryness to yield 20,20 - ethylenedioxy - pregna-1,4-dien-17α-ol-3-one which is recrystallized from acetone:hexane.

A solution of 0.5 g. of 20,20-ethylenedioxypregna-1,4-dien-17α-ol-3-one in 5 ml. of dimethylsulfoxide is added to a solution of one equivalent of dimethylsulfoxonium methylide in dimethylsulfoxide, prepared in the manner of Corey et al., J. Am. Chem. Soc., 87, 1353 (1965). The mixture is stirred under nitrogen and at room temperature for 20 hours and then at 50 C. for seven hours. Fifty milliliters of water are then added and the resulting mixture extracted four times with 50 ml. of ethyl acetate. The combined extracts are washed with water and saturated aqueous sodium chloride solution, dried over sodium sulfate, and evaporated to dryness. This residue is then chromatographed on silica, eluting with ether: methylene chloride to yield 1α,2α-methylene-20,20-ethylenedioxypregn-4-en-17α-ol-3-one and its corresponding 1β,2β-methylene isomer.

A mixture of 0.5 g. of 1,2-methylene-20,20-ethylenedioxypregn-4-en-17α-ol-3-one in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate, and evaporated to dryness. The residue is triturated with ether to yield 1,2-methylenepregn-4-en-17α-ol-3,20-dione which is recrystallized from acetone:hexane.

Similarly, the 1,2-methylene derivatives of the other corresponding starting compounds hereof are prepared.

The isomeric 6,7-methylene derivatives are analogously prepared from the corresponding $\Delta^{4,6}$ starting compounds.

Upon introduction of the $\Delta^{4,6}$ system into the so produced 1,2-methylene compounds and treating them according to the procedure set forth in Example 12 above, the corresponding 1,2 - methylene-6,7-difluoromethylene compounds are prepared.

EXAMPLE 14

To a solution of 1 g. of 17α-(bicyclo[2.2.2]octane-1'-carbonyloxy)-pregn-4-en-3β-ol-20-one in 20 ml. of benzene, 20 ml. of dihydrofuran is added. Five milliliters is distilled off to remove moisture and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The oily residue crystallizes on the addition of ether to yield 3β-tetrahydrofuran-2'-yloxy-17α - (bicyclo[2.2.2]octane-1' - carbonyloxy)-pregn-4-en-20-one.

Two milliliters of dihydropyran are added to a solution of 1 g. of 17α-(bicyclo[2.2.2]octane-1'-carbonyloxy)-pregn-4-en-3β-ol-20-one in 15 ml. of benzene. About 1 ml. is removed by distillation to remove moisture and 0.4 g. of p-toluenesulfonyl chloride is added to the cooled solution. This mixture is allowed to stand at room temperature for four days and is then washed with aqueous sodium carbonate solution and water, dried, and evaporated. The residue is chromatographed on neutral alumina, eluting with hexane, to yield 3β-tetrahydropyran-2' - yloxy - 17α - (bicyclo[2.2.2]octane-1'-carbonyloxy)-pregn-4-en-20-one which is recrystallized from pentane.

A solution of one chemical equivalent of 17α-(bicyclo-[2.2.2]octane - 1' - carbonyloxy)-pregn-4-en-3β-ol-20-one in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes, the mixture is allowed to reflux for 20 hours after which time the precipitate of sodium bromide is removed by filtration and the organic phase dried and evaporated to yield 3β-cyclopentyloxy-17α-(bicyclo-[2.2.2]octane - 1'-carbonyloxy)-pregn-4-en-3β-ol-20-one which is further purified upon recrystallization from pentane.

In like manner, the foregoing etherification procedures can be practiced on the other 3β-hydroxy derivatives already bearing the 17α novel mono ester.

What is claimed is:
1. Compounds of the formula:

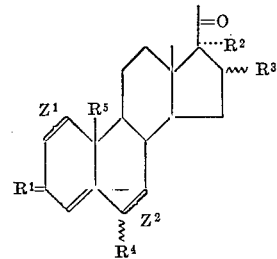

wherein:
$R^1$ is an oxygen atom or the group

in which $R^6$ is hydroxy and the conventional hydrolyzable esters thereof, tetrahydropyran-2-yloxy, tetrahydrofuran-2-yloxy, cyclopentyloxy, or a polycyclic group represented by one of the formulas:

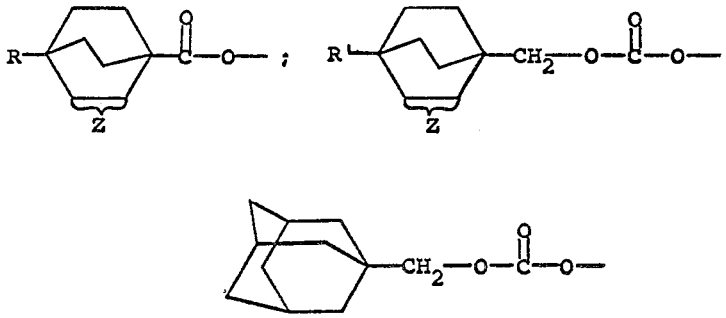

in which R is hydrogen, chloro, fluoro, trifluoromethyl, cyano, (lower)alkyloxy, acyloxy, (lower)alkyloxymethyl, acyloxymethyl, (lower)alkyl, or aryl; R' is identical in meaning to R, exclusive of cyano, acyloxy and acyloxymethyl; and Z is a carbon-carbon single bond or a carbon-carbon double bond;

$R^2$ is hydrogen, hydroxy and the conventional hydrolyzable esters thereof or a polycyclic group represented by the formula:

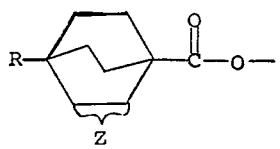

in which each of R and Z is as already defined;
$R^3$ is hydrogen, hydroxy, methyl, or when taken together with $R^2$, alkylidenedioxy;
$R^4$ is hydrogen, chloro, fluoro, or methyl;
$R^5$ is hydrogen or methyl;
each of $Z^1$ and $Z^2$ is a carbon-carbon single bond, a carbon-carbon double bond, or a methylene group of the formula

in which each of X and Y is hydrogen, chloro, or fluoro, $Z^1$ being a carbon-carbon single bond when $R^1$ is other than an oxygen atom and when $R^5$ is hydrogen;
one of $R^2$ and $R^6$ being said polycyclic group.

2. Compounds according to claim 1 wherein $R^2$ is said polycyclic group.

3. Compounds according to claim 1 wherein $R^1$ is the group

in which $R^6$ is one of said polycyclic groups.

4. A compound according to claim 3 wherein $R^6$ is the group

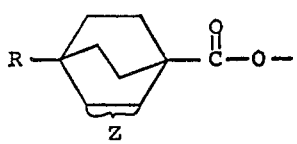

in which R is methyl; Z is a carbon-carbon single bond; and $R^2$ is acetoxy, $R^3$ is hydrogen, $R^4$ is chloro, $R^5$ is methyl, $Z^1$ is a carbon-carbon single bond; and $Z^2$ is a carbon-carbon double bond.

5. A compound according to claim 3 wherein $R^6$ is the group

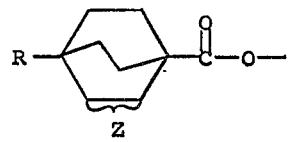

in which R is methyl, Z is a carbon-carbon single bond; and $R^2$ is acetoxy, $R^3$ is hydrogen, $R^4$ is methyl, $R^5$ is methyl, $Z^1$ is a carbon-carbon single bond; and $Z^2$ is a carbon-carbon double bond.

6. A compound according to claim 3 wherein $R^6$ is the group

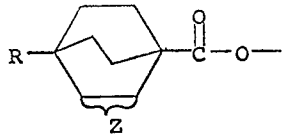

in which R is methyl, Z is a carbon-carbon single bond; and $R^2$ is acetoxy, $R^3$ is hydrogen, $R^4$ is hydrogen, $R^5$ is methyl, $Z^1$ is a carbon-carbon single bond; and $Z^2$ is a carbon-carbon single bond.

7. A compound according to claim 3 wherein $R^6$ is the group

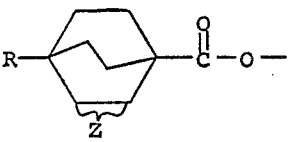

in which R is methyl, Z is a carbon-carbon double bond; and $R^2$ is acetoxy, $R^3$ is hydrogen, $R^4$ is chloro, $R^5$ is methyl, $Z^1$ is a carbon-carbon single bond; and $Z^2$ is a carbon-carbon double bond.

8. A compound according to claim 3 wherein $R^6$ is the group

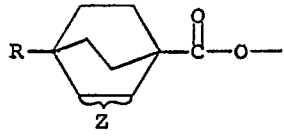

in which R is methyl; Z is a carbon-carbon double bond; and $R^2$ is acetoxy, $R^3$ is hydrogen, $R^4$ is methyl, $R^5$ is methyl, $Z^1$ is a carbon-carbon single bond; and $Z^2$ is a carbon-carbon double bond.

9. A compound according to claim 3 wherein $R^6$ is the group

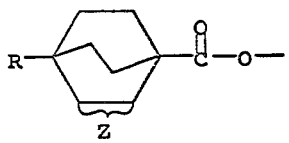

in which R is methyl, Z is a carbon-carbon double bond; and $R^2$ is acetoxy, $R^3$ is hydrogen, $R^4$ is hydrogen, $R^5$ is methyl, $Z^1$ is a carbon-carbon single bond; and $Z^2$ is a carbon-carbon single bond.

10. A compound according to claim 3 wherein $R^6$ is the group

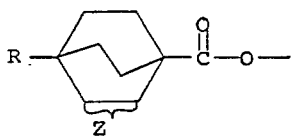

in which R is methyl, Z is a carbon-carbon single bond; and $R^2$ is hydrogen, $R^3$ is α-methyl, $R^4$ is chloro, $R^5$ is methyl, $Z^1$ is a carbon-carbon single bond, and $Z^2$ is a carbon-carbon single bond.

11. A compound according to claim 3 wherein $R^6$ is the group

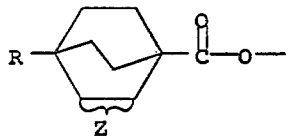

in which R is methyl, Z is a carbon-carbon single bond; and $R^2$ is hydrogen, $R^3$ is α-methyl, $R^4$ is β-methyl, $R^5$ is methyl, $Z^1$ is a carbon-carbon single bond, and $Z^2$ is a carbon-carbon single bond.

12. A compound according to claim 3 wherein $R^6$ is the group

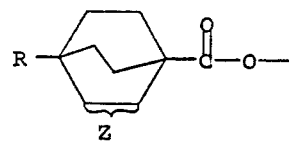

in which R is methyl, Z is a carbon-carbon double bond; and $R^2$ is hydrogen, $R^3$ is α-methyl, $R^4$ is chloro, $R^5$ is methyl, $Z^1$ is a carbon-carbon single bond, and $Z^2$ is a carbon-carbon single bond.

13. A compound according to claim 3 wherein $R^6$ is the group

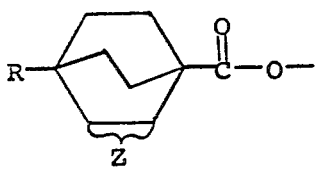

in which R is methyl, Z is a carbon-carbon double bond; and $R^2$ is hydrogen, $R^3$ is α-methyl, $R^4$ is β-methyl, $R^5$ is methyl, $Z^1$ is a carbon-carbon single bond, and $Z^2$ is a carbon-carbon single bond.

14. A compound according to claim 3 wherein $R^6$ is the group

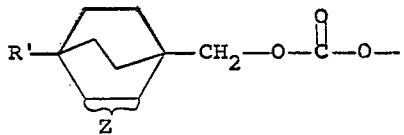

in which R' is methyl, Z is a carbon-carbon single bond; and $R^2$ is acetoxy, $R^3$ is hydrogen, $R^4$ is chloro, $R^5$ is methyl, $Z^1$ is a carbon-carbon single bond; and $Z^2$ is a carbon-carbon double bond.

15. A compound according to claim 3 wherein $R^6$ is the group

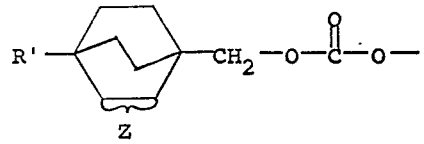

in which R' is methyl, Z is a carbon-carbon single bond; and $R^2$ is acetoxy, $R^3$ is hydrogen, $R^4$ is methyl, $R^5$ is methyl, $Z^1$ is a carbon-carbon single bond; and $Z^2$ is a carbon-carbon double bond.

16. A compound according to claim 3 wherein $R^6$ is the group

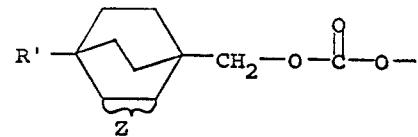

in which R' is methyl, Z is a carbon-carbon single bond; and $R^2$ is acetoxy, $R^3$ is hydrogen, $R^4$ is hydrogen, $R^5$ is methyl, $Z^1$ is a carbon-carbon single bond; and $Z^2$ is a carbon-carbon single bond.

17. A compound according to claim 3 wherein $R^6$ is the group

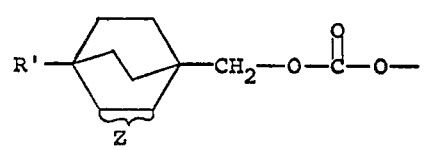

in which R' is methyl, Z is a carbon-carbon double bond; and $R^2$ is acetoxy, $R^3$ is hydrogen, $R^4$ is chloro, $R^5$ is methyl, $Z^1$ is a carbon-carbon single bond; and $Z^2$ is a carbon-carbon double bond.

18. A compound according to claim 3 wherein $R^6$ is the group

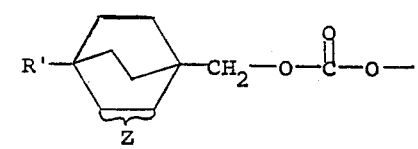

in which R' is methyl, Z is a carbon-carbon double bond, and $R^2$ is acetoxy, $R^3$ is hydrogen, $R^4$ is methyl, $R^5$ is methyl, $Z^1$ is a carbon-carbon single bond; and $Z^2$ is a carbon-carbon double bond.

19. A compound according to claim 3 wherein $R^6$ is the group

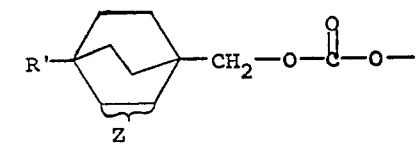

in which R' is methyl, Z is a carbon-carbon double bond, and $R^2$ is acetoxy, $R^3$ is hydrogen, $R^4$ is hydrogen, $R^5$ is methyl, $Z^1$ is a carbon-carbon single bond; and $Z^2$ is a carbon-carbon single bond.

20. A compound according to claim 3 wherein $R^6$ is the group

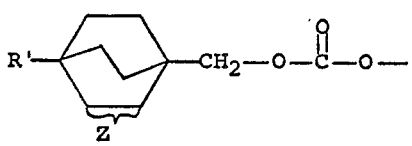

in which R' is methyl, Z is a carbon-carbon single bond; and $R^2$ is hydrogen, $R^3$ is α-methyl, $R^4$ is chloro, $R^5$ is methyl, $Z^1$ is a carbon-carbon single bond, and $Z^2$ is a carbon-carbon single bond.

21. A compound according to claim 3 wherein $R^6$ is the group

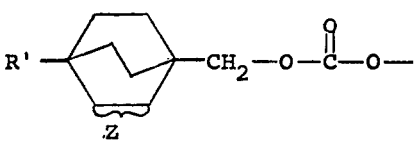

in which R' is methyl, Z is a carbon-carbon single bond; and $R^2$ is hydrogen, $R^3$ is α-methyl, $R^4$ is β-methyl, $R^5$ is methyl, $Z^1$ is a carbon-carbon single bond, and $Z^2$ is a carbon-carbon single bond.

22. A compound according to claim 3 wherein $R^6$ is the group

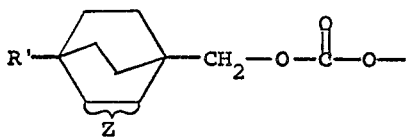

in which R' is methyl, Z is a carbon-carbon double bond; and $R^2$ is hydrogen, $R^3$ is α-methyl, $R^4$ is chloro, $R^5$ is methyl, $Z^1$ is a carbon-carbon single bond, and $Z^2$ is a carbon-carbon single bond.

23. A compound according to claim 3 wherein $R^6$ is the group

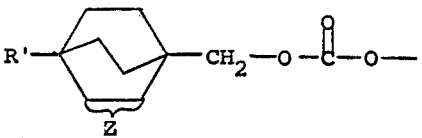

in which R' is methyl, Z is a carbon-carbon double bond; and $R^2$ is hydrogen, $R^3$ is α-methyl, $R^4$ is β-methyl, $R^5$ is methyl, $Z^1$ is a carbon-carbon single bond, and $Z^2$ is a carbon-carbon single bond.

24. A compound according to claim 3 wherein $R^6$ is the group

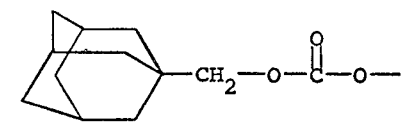

and $R^2$ is acetoxy, $R^3$ is hydrogen, $R^4$ is chloro, $R^5$ is methyl, $Z^1$ is a carbon-carbon single bond, and $Z^2$ is a carbon-carbon double bond.

25. A compound according to claim 3 wherein $R^6$ is the group

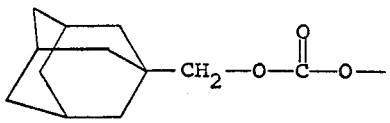

and $R^2$ is acetoxy, $R^3$ is hydrogen, $R^4$ is methyl, $R^5$ is methyl, $Z^1$ is a carbon-carbon single bond, and $Z^2$ is a carbon-carbon double bond.

26. A compound according to claim 3 wherein $R^6$ is the group

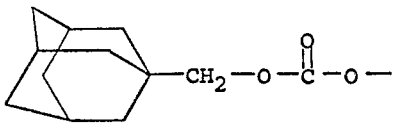

and $R^2$ is acetoxy, $R^3$ is hydrogen, $R^4$ is hydrogen, $R^5$ is methyl, $Z^1$ is a carbon-carbon single bond, and $Z^2$ is a carbon-carbon single bond.

27. A compound according to claim 3 wherein $R^6$ is the group

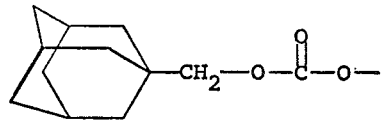

and $R^2$ is hydrogen, $R^3$ is α-methyl, $R^4$ is chloro, $R^5$ is methyl, $Z^1$ is a carbon-carbon single bond, and $Z^2$ is a carbon-carbon single bond.

28. A compound according to claim 3 wherein $R^6$ is the group

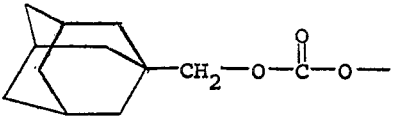

and $R^2$ is hydrogen, $R^3$ is α-methyl, $R^4$ is β-methyl, $R^5$ is methyl, $Z^1$ is a carbon-carbon single bond, and $Z^2$ is a carbon-carbon single bond.

No references cited.

ELBERT L. ROBERTS, Primary Examiner

U.S. Cl. X.R.

260—239.55, 999